(12) United States Patent  (10) Patent No.: US 6,565,270 B2
Naganuma  (45) Date of Patent: May 20, 2003

(54) LIGHT QUANTITY CONTROLLER AND CAMERA SYSTEM INCLUDING THE SAME

(75) Inventor: Hiroaki Naganuma, Kofu (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 09/950,619

(22) Filed: Sep. 13, 2001

(65) Prior Publication Data

US 2002/0031353 A1 Mar. 14, 2002

(51) Int. Cl.[7] ................................................. G03B 9/08
(52) U.S. Cl. ........................ 396/454; 396/463; 396/469
(58) Field of Search .................................. 396/454, 459, 396/462, 486, 463, 467, 469, 493

(56) References Cited

U.S. PATENT DOCUMENTS 5,705,873 A * 1/1998 Sato .......................... 310/193

FOREIGN PATENT DOCUMENTS

JP  6-258683   9/1994
JP  10-221740  8/1998

* cited by examiner

Primary Examiner—David M. Gray
(74) Attorney, Agent, or Firm—Kanesaka & Takeuchi

(57) ABSTRACT

A light quantity control unit includes a base plate having an aperture forming an optical axis; a blade member for regulating a condition of the aperture; a coil and a magnet rotor polarized with two magnetic poles, formed on the base plate; and a pair of magnetic force inducing members. Each member has a base end part, and a leading end part extending from the base end part perpendicular to the optical axis and having an equal thickness throughout an entire length thereof. The leading end parts surround the magnet rotor at a middle area thereof and have magnetic poles for rotating the magnet rotor. A regulating device is formed at the base plate for regulating a rotation of the magnet rotor to swing at a predetermined angle between the magnetic poles formed in the magnetic force inducing members.

20 Claims, 13 Drawing Sheets

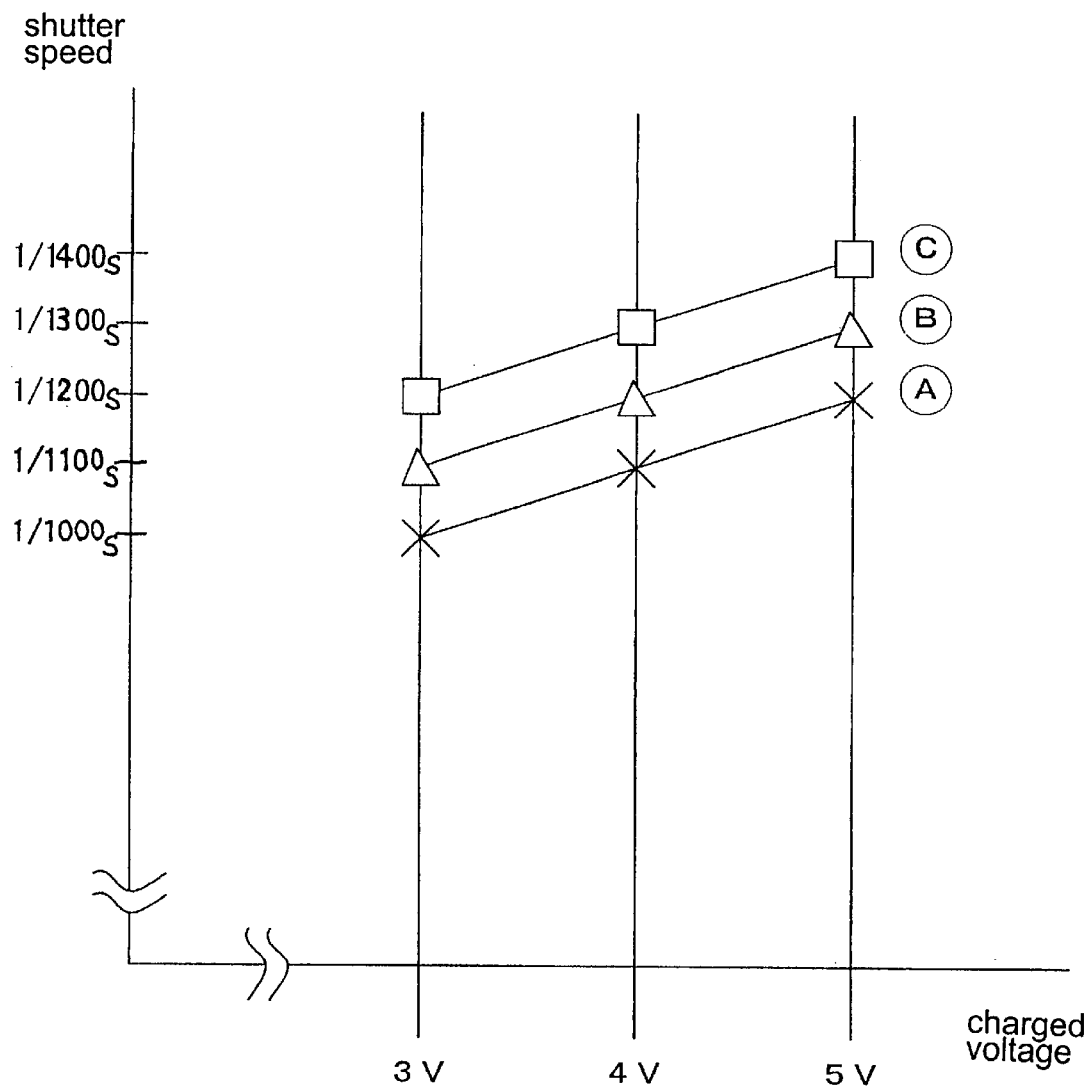

LIGHT QUANTITY CONTROLLER AND CAMERA SYSTEM INCLUDING THE SAME

BACKGROUND OF THE INVENTION

1. Field of the Invention

The present invention relates to a light quantity control unit used in various camera devices such as video cameras and still cameras. Specifically, it relates to a light quantity control unit such as a diaphragm for regulating the amount of light in a photographing operation or a shutter for blocking the light in a photographing operation and a camera device using the same.

2. Description of the Related Arts

This type of light quantity control unit is comprised of a ring shape base plate integrated in the photographing lens part and has an optical axis aperture, one or a plurality of blade members being revolvingly mounted to this base plate and border on the aperture, and an electro-magnetic drive unit interlocked to the blade member and mounted to said base plate. By applying an electric current to this electro-magnetic drive unit, said blade member revolves and the aperture is blocked or the diameter of the aperture is reduced.

Conventionally, this electro-magnetic drive unit was integrated into one body with said base plate and various methods thereof have been proposed. As a representative drive unit, there is a method of supporting and holding a magnetic rotor with a coil frame revolving freely, winding a coil on the coil frame to envelope the rotor, covering the periphery thereof with a yoke, and revolving the rotor according to Fleming's left-hand rule by exciting this coil as is disclosed, for example, in Japanese Patent Publication (Kokaihei) No. 10-221740. Even as described in Kokaihei 10-221740, what mounts this drive unit on the aforementioned base plate and transmits the rotating force of said magnet rotor to the blade member is proposed.

Also, there is another method of supporting and holding a magnet rotor at the peripheral part of the base plate in the direction of the optical axis, mounting a coil wound similarly at the peripheral part in the direction orthogonal to the optical axis, opposingly arranging the leading ends of a pair of soft magnetic members engaged at the one ends to said coil at the periphery of said magnet rotor, forming magnetic poles at the leading ends of these soft magnetic members by conducting to the coil, and obtaining a turning torque between the magnetic poles polarized in the magnetic rotor as is proposed, for example, in Japanese Patent Publication (Kokaihei) No. 6-258683. When using this method, a coil, paired soft magnetic members and a magnetic roller are arranged.

The aforementioned prior art has the following demerits. The drive unit in the method disclosed in Kokaihei 10-221740 has a demerit of the drive unit becoming large since there is a coil frame at the periphery of the magnet rotor, a coil at the periphery thereof, and the entire body covered with a yoke. Also, a coil frame exists between the magnet rotor and the coil thus the efficiency degrades due to the thickness thereof. Therefore, it is necessary to increase the number of windings of the coil and the drive unit becomes large. In particular, when arranging plural drive units such as for the shutter blade and for the diaphragm blade at the periphery of the base plate, there is a demerit of causing the drive unit to become large or the opening and closing speed of the blades becoming slow from decreasing the number of windings of the coil.

Next, the drive unit in the method disclosed in Kokaihei 6-258683 has a demerit of the major diameter of the base plate becoming large since the cylindrical coil and the pair of soft magnetic members extended from the two open ends of this coil are arranged at the periphery of the base plate in a horizontal position. This method was particularly difficult to apply when arranging a plurality of drive units at the periphery of the base plate.

SUMMARY OF THE INVENTION

An object of the present invention is to provide a light quantity control unit having a compact drive unit of small major diameter, which takes up small space in the direction of the optical axis, at the periphery of the optical axis of the photographing lens part.

Another object of the present invention is to provide a compact light control unit integrated with a plurality of blades such as diaphragm blades and shutter blades and a plurality of drivers.

Still another object of the present invention is to provide a compact camera device integrated with the aforementioned light quantity control unit.

In order to achieve the aforementioned purpose, this invention is composed as follows.

First of all, a blade member having an aperture is arranged on a base plate to border on the aperture. Then, a coil and a magnet rotor of a substantially cylindrical shape are arranged on this base plate at a parallel with a space in-between and with the axial direction thereof oriented in the direction of the optical axis. Then, a pair of magnetic force inducing members are extended from the two end parts of said coil, which are the end parts in the direction of the optical axis, and the leading ends thereof are opposingly arranged with said magnet rotor interposed. Then N pole-S pole are formed in this pair of magnetic force inducing members at the two mutually opposing magnetic poles. Also, N pole-S pole are polarized in said magnet rotor thus the magnet rotor receives a rotating force from the mutual magnetic function of the magnetic poles of the magnetic force inducing members and the magnet rotor. Then, the revolving motion of the magnet rotor is swung at a predetermined angle by a regulating means, which regulates the movement between the two magnetic poles formed in the aforementioned magnetic force inducing members.

By composing the light quantity control unit as described above, the coil and the magnet motor occupy the space in the direction of the optical axis on a base plate normally formed into a ring shape and the magnetic force inducing members occupy the space in the direction orthogonal to the optical axis. Furthermore, rotating force is bestowed to the magnet rotor by the mutual magnetic function of the two polarized magnetic poles and the two magnetic poles formed in the magnetic force inducing members so the structure is simple. As a result, the unit can be miniaturized.

What is more preferable is to engage the base end parts of the aforementioned pair of magnetic force inducing members with the two open ends of the aforementioned coil, bend at least one section at the leading ends of the aforementioned paired magnetic force inducing members, and oppose at approximately the center part in the length wise direction which is the direction of the optical axis of said coil. By doing so, the magnetic resistances of the pair of magnetic force inducing members are equalized, the magnetic field formed in the coil transmits the respective magnetic force inducing member, and both N-S poles of approximately equal magnetic force can be formed at the opposing leading ends.

Note that arranging the leading ends of the magnetic force inducing members at the center position in the length wise direction which is the direction of the optical axis of the coil is most preferable in this case but an appropriate position between the two end parts of the coil, which are the end parts in the direction of the optical axis, should be selected based on the arranged relationship with the other parts.

Furthermore, the aforementioned regulating means can change the speed for opening and closing the blade member (s) by differentiating the attraction force formed between the pair of magnetic force inducing members and the two magnetic poles N-S of the aforementioned magnet rotor between the open area and the close area. Namely, the blades can be closed from the opened state at a high speed by setting the attraction force in the open area to be less than the close area.

It is possible to change the amount of said attraction force by differentiating the shape or the material of the pair of inducing members, which form the magnetic poles. Also, it is possible to change the amount of said attraction force by differentiating the distance of the magnetic poles in the magnet rotor and the magnetic poles in the aforementioned pair of magnetic force inducing members between the open area and the closed area.

To mount the aforementioned coil and the magnet rotor on the aforementioned base plate at a parallel, a holding member is provided to the base plate with a space in-between in the direction of the optical axis and mount the coil and the magnet rotor between this holding member and the base plate so that the two ends thereof are supported by the holding member and the base plate.

DETAILED DESCRIPTION OF THE DRAWINGS

FIG. 3(*b*) shows an embodiment of the present invention and it is a partial cross-sectional view showing the required parts of a light quantity control unit.

FIG. 12 shows an embodiment of the present invention and it is test data for the operating principle of a light quantity control unit.

DETAILED DESCRIPTION OF THE PREFERRED EMBODIMENTS

Figure 1:
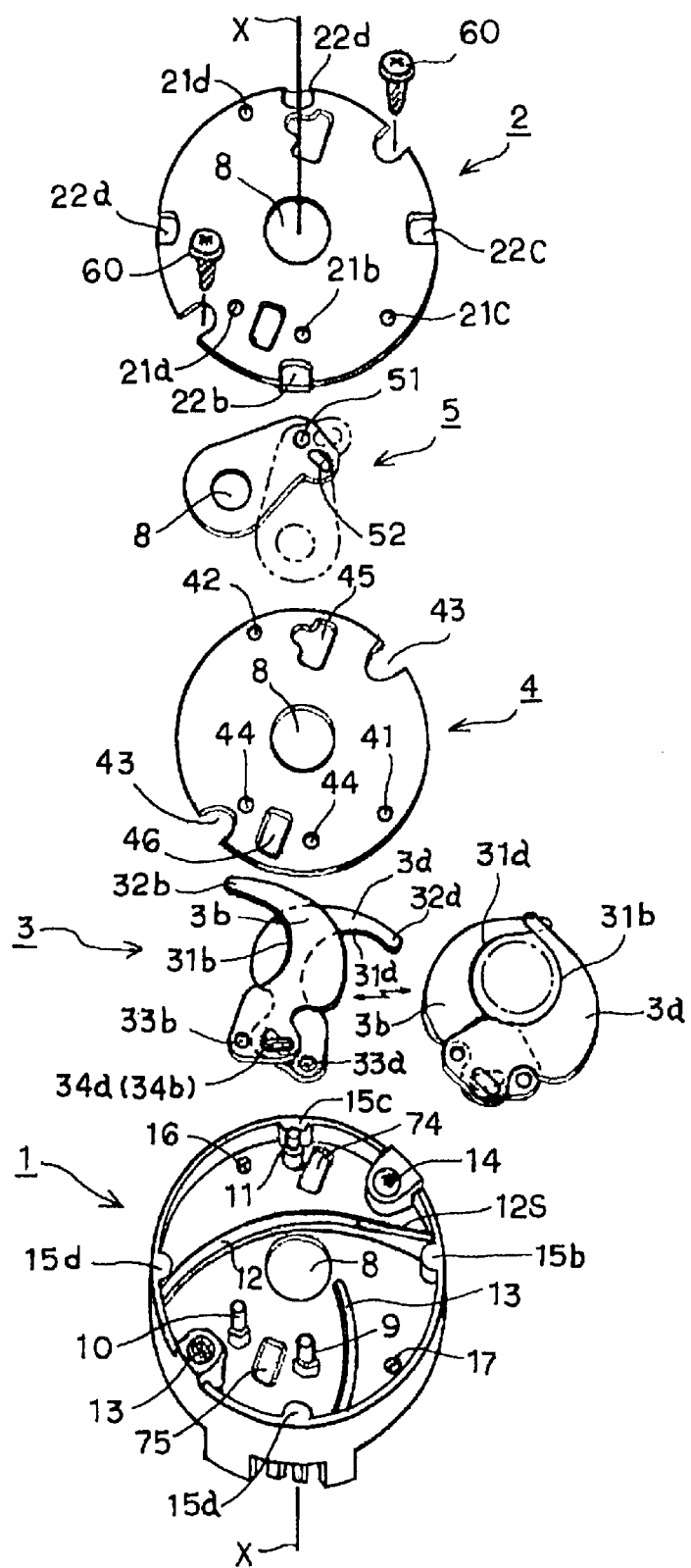
FIG. 1 shows an embodiment of the present invention and it is an exploded perspective view showing the front side of a light quantity control unit.

The following is a detailed explanation of the preferred embodiment of the present invention based on the drawings provided.

Below, working modes of the present invention will be explained based on the embodiments shown in the drawings.

Figure 2:
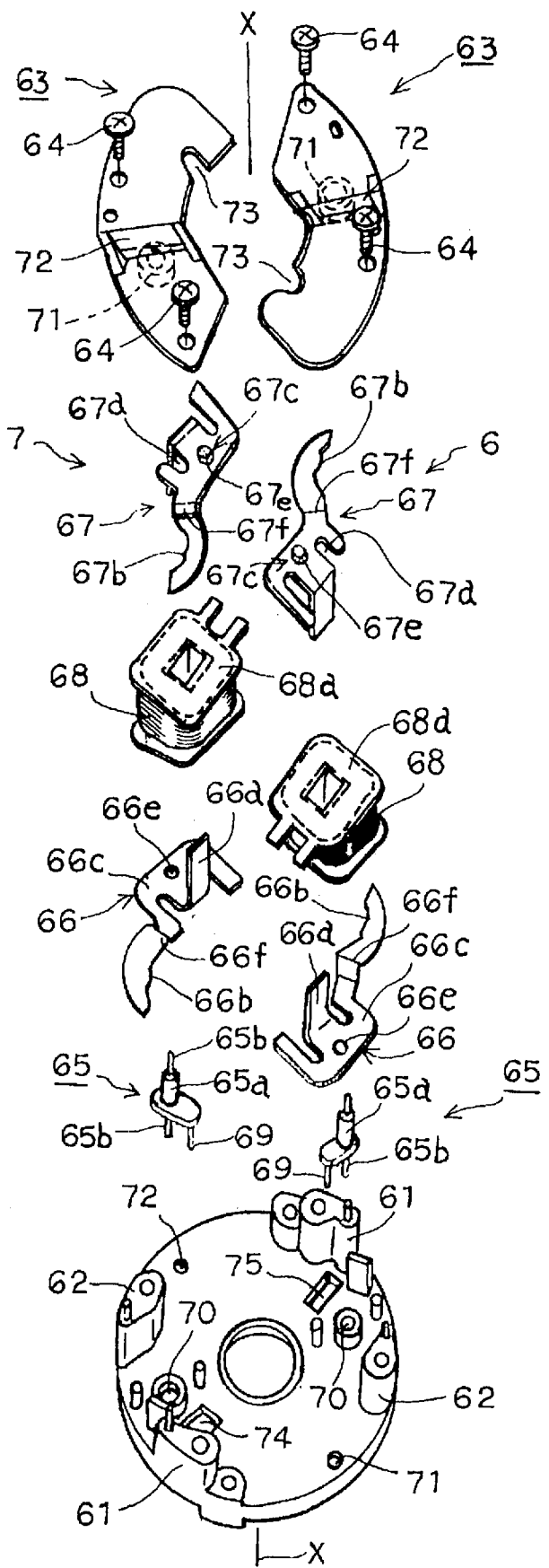
FIG. 2 shows an embodiment of the present invention and it is an exploded perspective view showing the back side of a light quantity control unit.

Initially, the light quantity control unit in the present invention is composed by superposing shutter blades 3, a middle plate 4, and a diaphragm blade 5 in this order between a pair of top and bottom base plates 1 and 2 as shown in FIG. 1. In addition, drive units (actuators) 6 and 7 (shown in FIG. 2), which open and close the shutter blades 3 and the diaphragm blade 5 separately are mounted to one of the base plates (the first base plate 1).

The opened state of the shutter blades 3 is shown at the side of the closed state.

The material of the first base plate 1 is a synthetic resin and is a molded product of, for example, polycarbonate resin mixed with 15% carbon fiber, and it is molded into a shape capable of being integrated to fit with the lens-barrel to be discussed later. As the size of the base plate 1 in the drawing, the diameter is 20 mm in conformance with the recent miniaturization of the lens-barrel.

An aperture 8 is provided to this base plate 1 so that the optical axis indicated with X—X in FIG. 1 is positioned at the center. On the front surface side thereof shown in FIG. 1, pins 9 and 10 composing the rotation axes of the shutter blades 3 and a pin 11 composing the rotation axis of the diaphragm blade 5 are formed integral to the base plate 1. Pin members not integral to the base plate 1 can be mounted to the base plate 1 instead as these pins 9, 10, and 11. It is also possible to dispose these pins on the second base plate 2 side. The number thereof and the arranged positions are determined by the number of shutter blades and diaphragm blades to be discussed later.

On the surface of the aforementioned first base plate 1, protruding guides 12 and 13 are provided for guiding the shutter blades 3 to the vicinity of the aperture 8. In the embodiment shown in the drawing, the shutter blades are composed of two blades thus two protruding guides are provided, namely, the guide 12 for supporting the bottom blade 3*a* out of the two shutter blades superposed on the first base plate and the guide 13 for supporting the top blade 3*b*. These protruding guides are formed into a rib shape within the moving track of the respective blade to make the sliding motion of the blades 3*a* and 3*b* smooth. As the form thereof, it is possible to arrange plural protrusions at a parallel in the moving direction or form a plurality of protrusions in a concentric circle.

The guide 12, which guides the bottom blade 3*a* out of the two superposed shutter blades, is constituted from a rib of uniform height so as to support the blade with the plane, which crosses the optical axis.

Similarly, even the guide 13, which guides the top blade 3*b*, is constituted from a rib of uniform height so as to support the blade with the plane, which crosses the optical axis.

Difference in height is provided to these guides 12 and 13 so that a small gap (space) is formed between the superposed blades 3a and 3b. The guide 12, which supports the bottom blade 3a, is low and the guide 13, which supports the top blade 3b, is high.

In the embodiment shown in the drawing, difference in height is set at 0.2 mm for the guides 12 and 13 when thickness of the blade 3a is 0.04 mm so that a gap of 0.16 mm is formed between the blades 3a and 3b.

Note that a slanted surface 12s which gradually becomes higher in the close area of the blade 3a is provided to the aforementioned guide 12. The function of this structure will be discussed later.

With regards to the shutter blades 3, various configurational forms are already known such as two blades, four blades, etc. but what is indicated in the drawing shows a configuration with two blades as one example. Regular shutter blades are fabricated by die cutting an aluminum thin plate then applying a coating of a black anodic oxide coating. However, in this case, the thickness of the aluminum thin plate is about 0.3 mm, the material is metal, and the specific gravity is high so the inertia of the shutter blades becomes great. In this case, the torque of the drive unit at the start and the bound of the shutter blades at the end create a problem when the blades are opened and closed at a high speed.

Therefore, the shutter blades shown in the drawing are fabricated by die cutting a resin film of thickness 0.04 mm. This resin film is fabricated by annealing a polyester film containing black pigment, and then applying a mat coating having shielding property.

The two blades 3a and 3b shown in the drawing have arc shape curved parts 31a and 31b on the inside so as to open and close the aperture 8 by dividing into two. Also, the leading ends 32a and 32b thereof are formed to overlap even in the completely opened state. Engaging holes 33a and 33b which mate with the pins 9 and 10 formed to the aforementioned first base plate 1 are formed at the base end parts of the blades and these blades 3a and 3b open and close the aperture by swinging to the left and right with pins 9 and 10 as the center.

After the shutter blades 3 are integrated to the first base plate 1 in the manner noted above, the diaphragm blade 5 is integrated. However, in order to prevent the mutual interference of the shutter blades 3 and the diaphragm blade 5, a middle plate 4 with the following configuration is provided. The middle plate 4 is composed from a flat plate member and is mounted to the first base plate 1, which is integrated with the shutter blades 3, by installing to the projecting parts 15a, 15b, 15c, and 15d provided to the first base plate and forming a small gap between the shutter blades 3. The dimension of this small gap is from 0.2 mm to 0.4 mm. The middle plate 4 has positioning holes 41 and 42, these positioning holes mate with the positioning pins 16 and 17 formed to the first substrate 1, and the position thereof is guaranteed.

Note that the receiving parts 14a and 14b for the securing screws used to mount the second base plate 2 to be discussed later and provided to the first base plate 1 are avoided with the cutout parts 43 in the middle plate 4.

44 denoted in the drawing is the recess hole for the pins 9 and 10 in the base plate 1 and 45 and 46 denoted in the drawing are the recess holes for the transmission member for the drive unit to be discussed later.

Next, the method for forming the middle plate 4 will be explained. This middle plate 4 is fabricated by die cutting a thin plate such as aluminum, etc. according to press working then applying a surface treatment of anodic oxide coating. In this case, the middle plate is mounted to the first base plate by facing the burr surface created by the press working to the diaphragm blade side and the opposite surface to the shutter blade side.

By press working a thin plate and fabricating the middle plate 4 in the manner noted above, it is possible to be made thinner by about a few millimeters when compared with a case of fabricating this by molding a synthetic resin.

The middle plate 4 shown in the drawing is fabricated by die cutting a resin film of thickness 0.04 mm in the same manner as the shutter blades 3. This resin film is fabricated by annealing a polyester film containing black pigment then applying a mat coating having shielding property.

Even in this case, the middle plate is mounted on the first base plate by facing the burr surface created in the machining to the diaphragm blade side and the opposite surface to the shutter blade side.

Next, the configuration of the diaphragm blade 5 will be explained. As the diaphragm blade 5, various configurations are known such as the double blade configuration in addition to the single blade configuration shown in the drawing and many of these can be applied to the present invention. The diaphragm blade 5 shown in the drawing is fabricated by die cutting a resin film of 0.04 mm thickness. This resin film is fabricated by annealing a polyester film containing black pigment then applying a mat coating having shielding property.

Namely, the shutter blade, the middle plate, and the diaphragm blade shown in the drawing are all fabricated by die cutting the same material so these three parts can be die cut in the same process during the manufacturing process. Therefore, the cost merit is great.

To this diaphragm blade 5, an aperture 8, an engaging hole 51 for the pin 11 formed to the first base plate, and a slit 52 which engages with the transmission member of the drive unit to be discussed later are formed.

Note that the pin 11 formed to the first base plate 1 is composed to mate with the engaging hole 51 in the diaphragm blade 5 by penetrating the recess hole 45 in the middle plate 4.

Figure 3A:
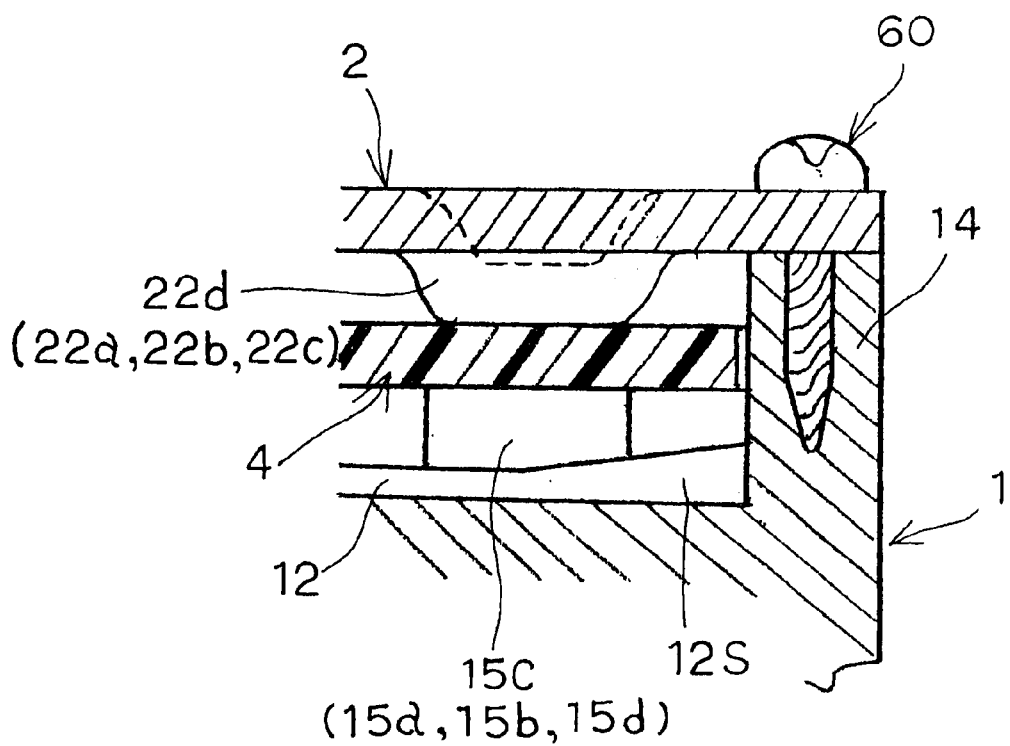
FIG. 3(*a*) shows an embodiment of the present invention and it is a partial cross-sectional view showing the required parts of a light quantity control unit.
Figure 3B:
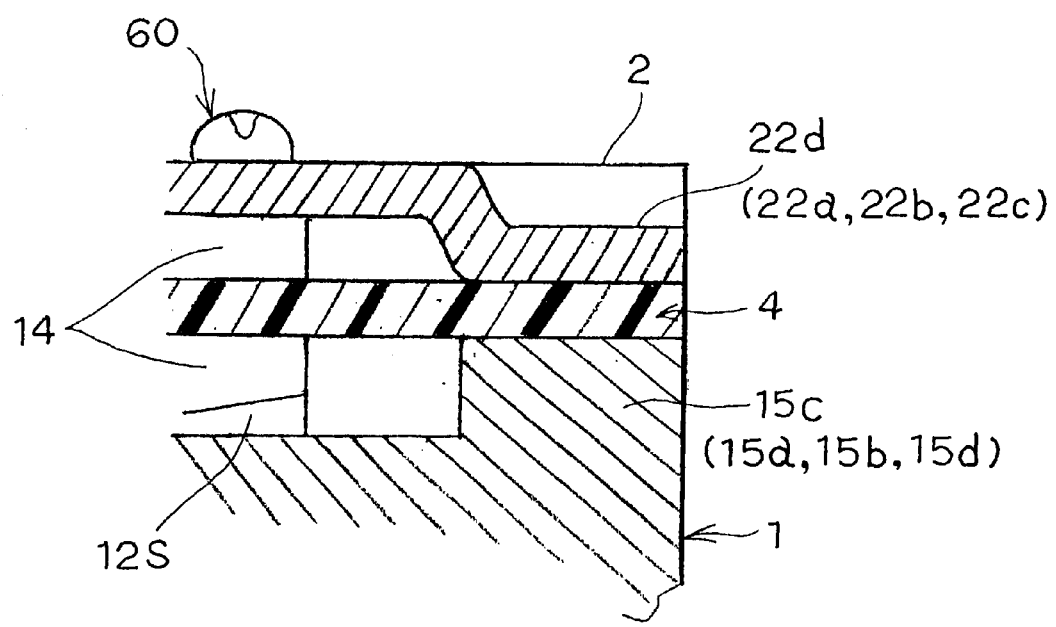
Figure 4:
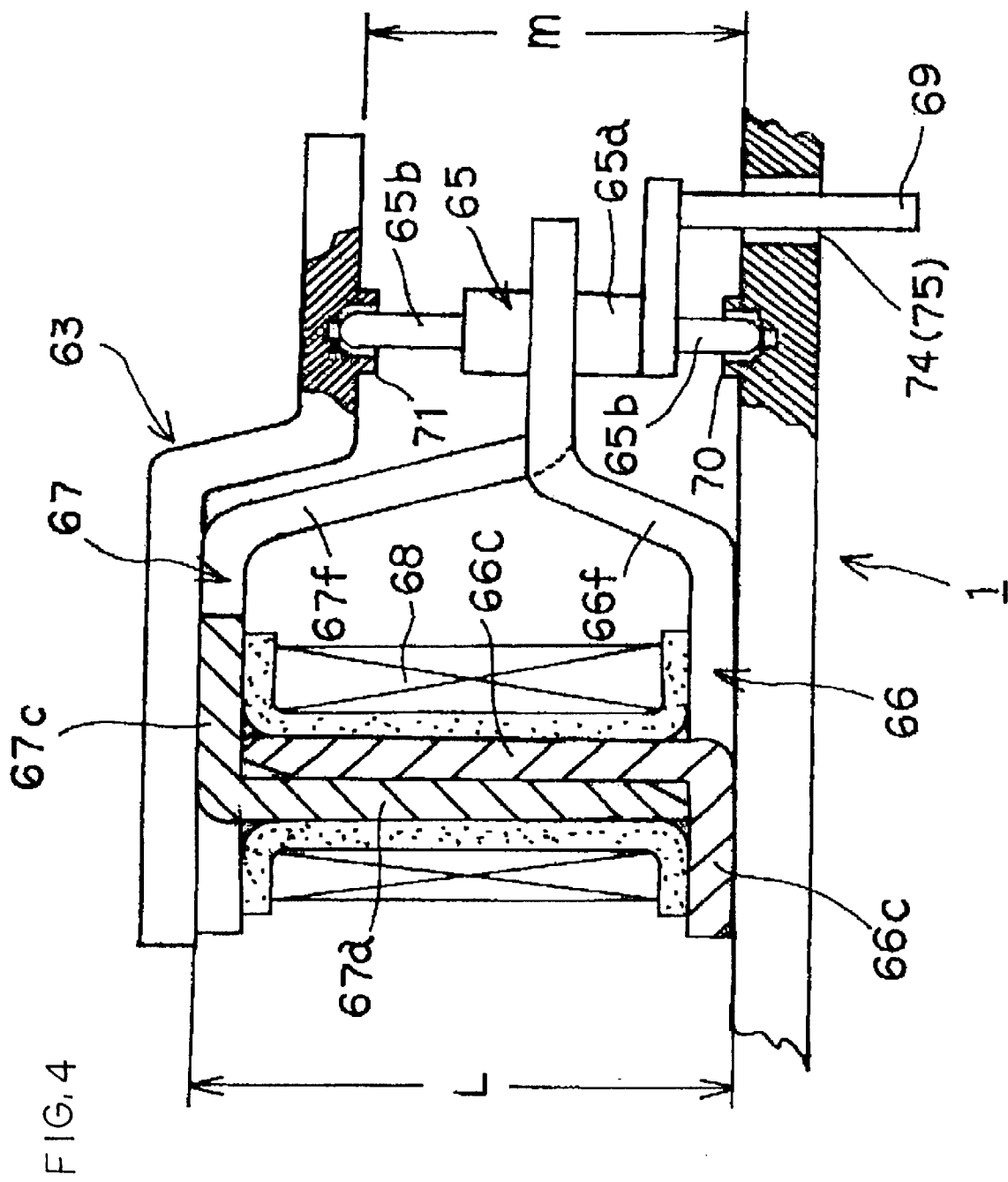
FIG. 4 shows an embodiment of the present invention and it is a partial cross-sectional view showing the required parts of a light quantity control unit.

As noted above, the shutter blades 3, the middle plate 4, and the diaphragm blade 5 are integrated to the first base plate 1 by being superposed in this order and the configurational parts are fixed by mounting a second base plate 2 on the first base plate 1 in a state of having interposed the middle plate 4 as shown in FIG. 3(a) and FIG. 3(b).

The second base plate 2 is fabricated by punching a metal plate such as aluminum, etc., an aperture 8 is formed at the center part thereof, and holes 21a, 21b, 21c, and 21d which mate with the pins 9, 10, 16, and 17 formed to base plate 1 are formed at the peripheral part. In this second base plate 2, dowel shape projecting parts 22a, 22b, 22c, and 22d projecting toward the back side of the paper surface in FIG. 1 are formed by machining at positions for joining with the projecting parts 15a, 15b, 15c, and 15d of the aforementioned first base plate 1.

Therefore, the aforementioned middle plate 4 is interposed between the projecting parts 15a, 15b, 15c, and 15d of the first base plate 1 and the projecting parts 22a, 22b, 22c, and 22d of the second base plate 2 then fixed by coupling the two base plates with securing screws 60. Also, the shutter blades 3a and 3b are supported between this middle plate 4 and the protruding guides 12 and 13 of the first base plate 1 and the diaphragm blade 5 is supported between this middle plate 4 and the second base plate 2.

Incidentally, what is fabricated by punching a black polyester film into the shape shown in the drawing is said diaphragm blade 5 but it is also possible to adhere a ND filter (neutral density filter) so as to cover the aperture 8 in the diaphragm blade 5.

Next, the drive unit for opening and closing the shutter blades 3 and the diaphragm blade 5 having the aforementioned configuration will be explained.

On the back face of the aforementioned first base plate 1 (shown in FIG. 2), a drive unit 6 for the shutter blades and a drive unit 7 for the diaphragm blade are mounted in identical configuration.

The two drive units 6 and 7 will be described by denoting with identical numbers. Flanges 61 and 62 are formed to the first base plate 1 to be integral to the first base plate 1. Bracket shape holding members 63 are mounted to these two flanges 61 and 62 with securing screws 64. Magnet rotors 65, magnetic force inducing members 66 and 67, and coils 68 are held between the back face of the first base plate 1 and the holding member 63.

Initially, the magnet rotor 65 is composed integrally by press fitting a shaft member 65b made of a synthetic resin into a cylindrical shape magnet 65a of a ferromagnetic material (e.g., rare earth magnet) polarized for NS to oppose. An arm shape transmission member 69 is formed integral to this shaft member 65b and this arm shape transmission member 69 engages with the slits 34a, 34b, and 52 in the blade members 3 and 5.

Also, the coil 68 is constituted by winding a conductor in a spiral shape on a coil frame 68a of hollow cylindrical shape (prismatic shape in the coil frame shown in the drawing) and this coil 68 has a cylindrical shape as a whole.

These cylindrical shape magnet rotor 65 and coil 68 are arranged by placing the axial direction at a parallel to the direction of the optical axis (X—X). This is based on the common knowledge that arranging the cylindrical magnet rotor 65 and the coil 68 by conforming the direction can minimize the occupying space of these, and furthermore, that arranging these at a parallel in the direction of the optical axis is most effective.

Said magnet rotor 65 and coil 68 are mounted as follows between the first base plate 1 and the holding member 63. Initially, the magnet rotor 65 is supported rotatably by mating the two ends of the shaft 65b thereof with the mating hole 70 in the first base plate 1 and the mating hole 71 in the holding member 63. The coil 68 is supported by being interposed between a pair of magnetic force inducing members 66 and 67 to be subsequently explained and these magnetic force inducing members 66 and 67 are fixed between the first base plate 1 and the holding member 63.

The coil 68 and the magnet rotor 65 arranged at a parallel as described above are magnetically interlocked such that the magnetic field created in this coil forms 2 poles NS in the pair of magnetic force inducing members 66 and 67 at the periphery of the magnet rotor 65.

Namely, the base end parts 66a and 67a of the magnetic force inducing members 66 and 67 are mated with the hollow open ends of the coil 68. Consequently, the base ends thereof are arranged within the magnetic field created in the coil and the leading ends 66b and 67b of said members are opposingly arranged at the periphery of the magnet rotor 65 with a small space between the magnet rotor 65.

There are mounting parts 66c and 67c at the center section of these magnetic force inducing members 66 and 67. The magnetic force inducing members 66 and 67 are fixed by contacting these mounting parts 66c and 67c to the first base plate 1 and the holding member 63 and securing the holding member with screws.

Mounting parts 66c and 67c are positioned by mating the dowels 66e and 67e formed to these mounting parts with the hole 72 in the first base plate 1 and the hole 73 in the holding member 63. Then, the base end parts 66a and 67a of the magnetic force inducing member 63 are assembled and fixed between the base plate 1 and the holding plate 63 with distance L being maintained as shown in FIG. 1. At this time, the magnetic force inducing members 66 and 67 are provided with bending parts 66f and 67f in at least one section and the leading ends 66b and 67b thereof form magnetic poles at approximately the center of length L in the lengthwise direction of the coil 68.

In the embodiment shown in the drawing, length m in the lengthwise direction of the magnet rotor 65 is shorter than direction L in the lengthwise direction of the coil 68 and has a relationship of L>m. Therefore, whereas the back face of the first base plate 1 is formed to be more or less flat, difference in level 72 is provided on the holding member (bracket) 63 side and a large coil mounting space L and a small rotor mounting space m are formed between the first base plate 1 and the holding member 63.

Therefore, one bending part 66f is bent slightly and the other bending part 67f is bent greatly in the aforementioned magnetic force inducing members 66 and 67. However, it is preferable for the amount of bending to be equal so that the magnetic resistances of the aforementioned magnetic force inducing members 66 and 67 can be equalized. However, the amount of bending can be biased to one side based on the regulation in the layout of the ocher configurational parts as shown in the drawings.

The following magnetic fields are created in the aforementioned drive units 6 and 7.

The aforementioned magnet rotor 65 is polarized so that two poles N-S are opposed and set apart by 180 degrees. At the periphery of this magnet rotor 65, the leading ends 66b and 67b of the pair of magnetic force inducing members 66 and 67 are opposingly arranged and set apart by 180 degrees and the positions of these leading end curved parts 66b and 67b are set to minimize the distance to the rotor 65 to the utmost.

Figure 5:
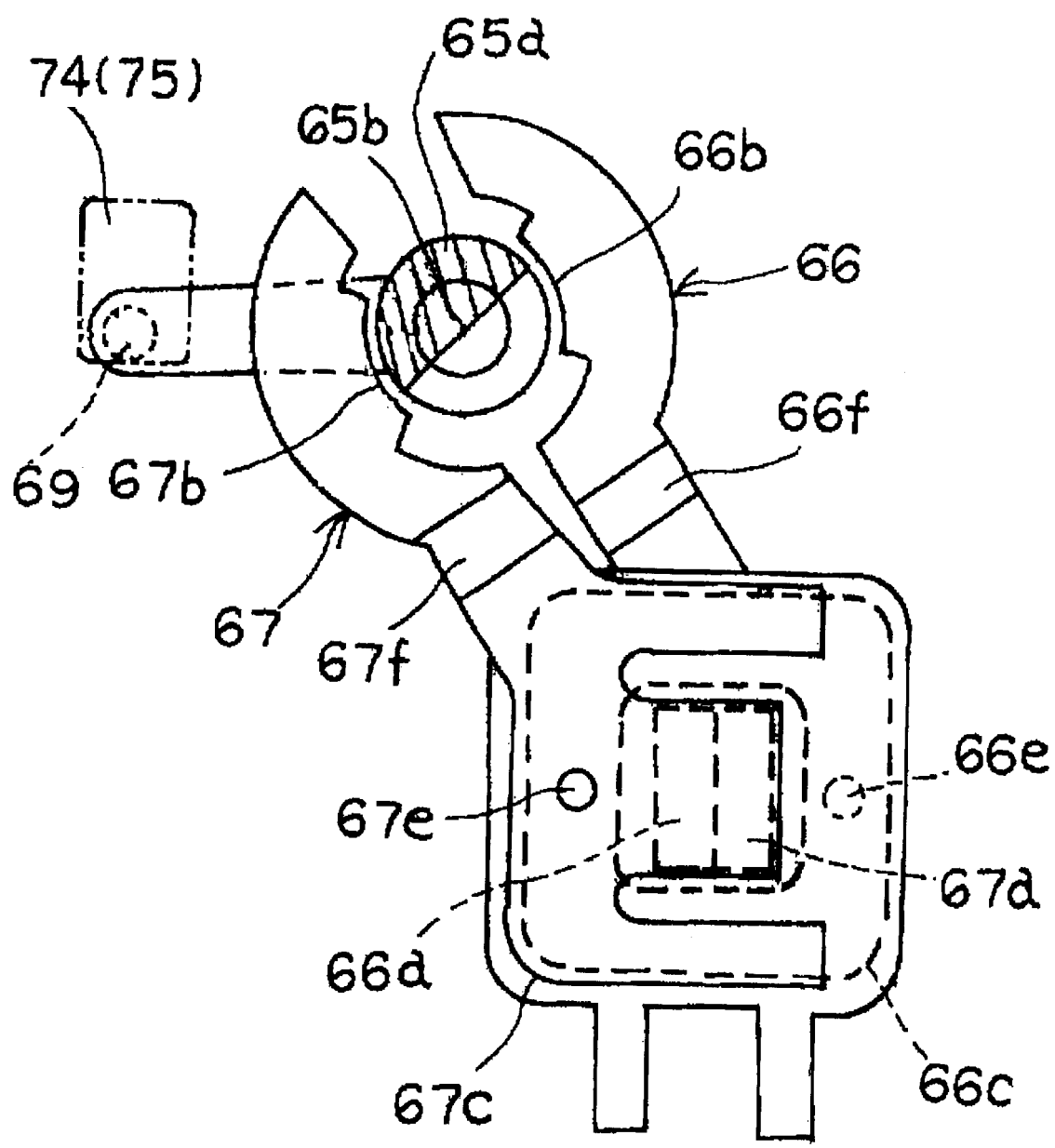
FIG. 5 shows an embodiment of the present invention and it is a top view showing the required parts of a drive unit in a light quantity control unit.
Figure 6:
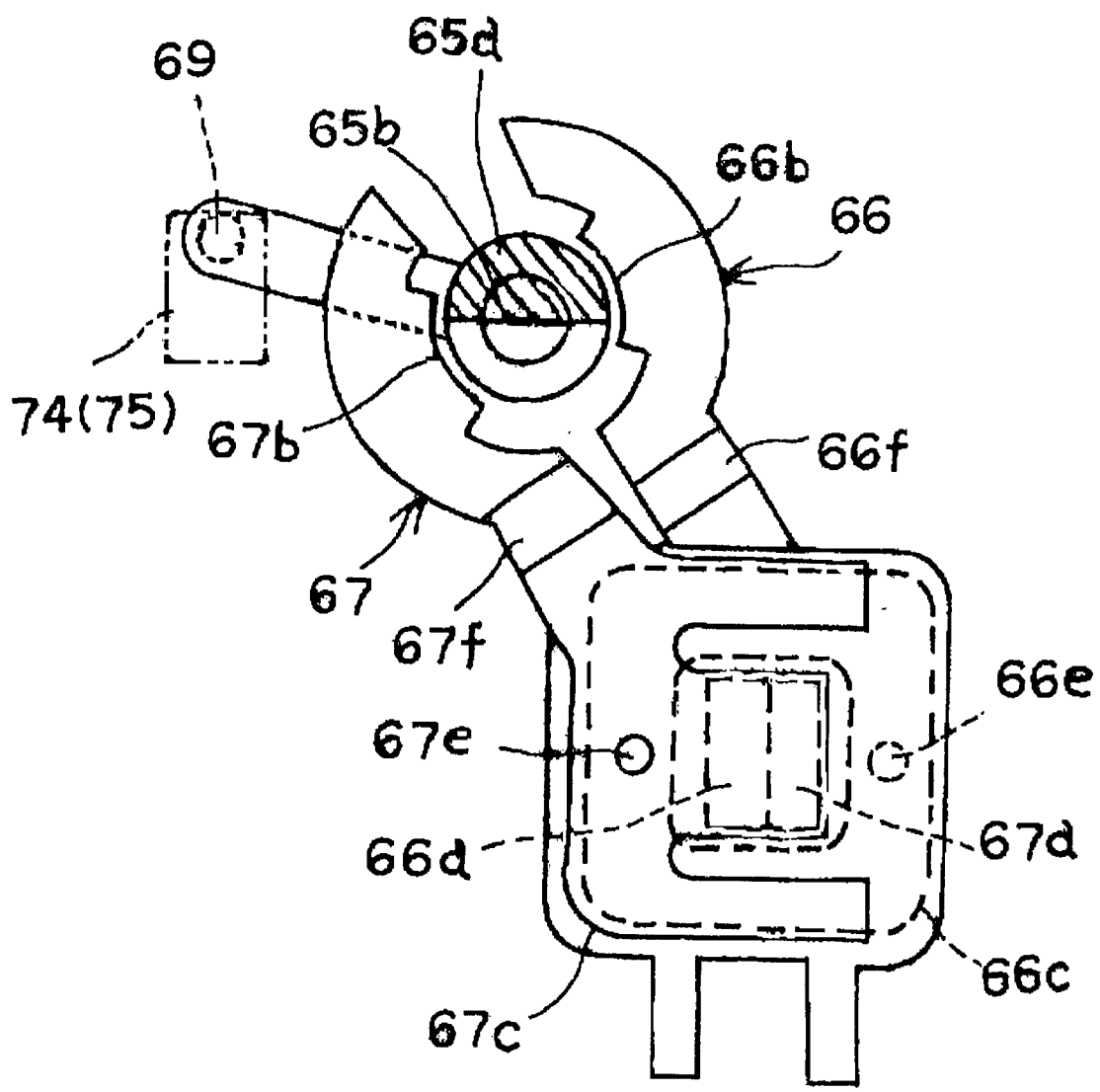
FIG. 6 shows an embodiment of the present invention and it is a top view showing the required parts of a drive unit in a light quantity control unit.

Therefore, the rotor 65 is constantly being attracted to either the leading end curved part 66b or 67b which ever is closer during a state of non-conduction to the coil 68. During a state of conduction to the coil 68, magnetic pole of either N-S is formed at the leading end curved parts 66b and 67b and receives a rotating force in the opposite direction. Then the rotating angle of said rotor 65 is regulated by the slits 74 and 75 formed to the first base plate 1 to be the open position shown in FIG. 5 and the close position shown in FIG. 6. Namely, the rotor 65 in the position shown in FIG. 5 is receiving a rotating force in the counterclockwise direction during a state of non-conduction to the coil, is stopped at the end parts of the slits 74 and 75, and is held at this position.

Next, when electric current is fed to the coil 68 and the same magnetic pole as the magnetic pole of the magnet rotor is formed in the magnetic force inducing members 66b and 67b, the rotor 65 rotates in the clockwise direction due to the repulsion of magnetism. When the electric current is cutoff at the section passing through the neutral point of the rotation, the magnetic pole of the rotor 65 is attracted to the magnetic force inducing members 66b and 67b on the opposite side and the rotor 65 rotates in the clockwise direction until being stopped at the end parts of the slits 74 and 75 shown in FIG. 6. The blades take on the closed state from the opened state and held at this position. Also, when electric current of inverse direction is conducted to the coil 68, the blades take the opened state from the closed state.

Note that in the embodiment shown in the drawings, the regulating means for regulating the movement of the blade members in the open area and the close area was constituted with the slits 74 and 75 formed to the base plate 1 but this regulating means can be stopper pins instead of slits. It is fine to simply provide stopper pins, slit grooves, or other regulating means at the positions for regulating the movement of either the magnet rotor, the transmission member linked to it, or the blade member.

The rotating torque functioning on the aforementioned magnetic rotor differs between the open area and the close area of the aforementioned blade members with this regulating means (slit 75 in the embodiment shown in the drawing). This will be described with the model in FIG. 11.

A case when 2 poles N-S are polarized in a magnet rotor 65 and a pair of soft magnetic members 66 and 67 are arranged at 180 degrees opposed positions of this rotor 65 will be assumed. The neutral points of the soft magnetic members 66 and 67 will be considered as 01 and 02, points M1 and M2 are denoted in the drawing as the magnetic pole positions of the rotor when the transmission member 69 which drives the blades in the open area is latched by the regulating means 74, points N1 and N2 are denoted in the drawing as the magnetic pole positions of the rotor when the transmission member 69 which drives the blades in the close area is latched by the regulating means 75, and N0 is denoted as the neutral point of the magnetic poles of the rotor. Also, the rotating angle of the rotor will be considered as 30 degrees. In this case, conventionally, the distance between M1 and O1 and the distance between N1 and 02 were set to be equal as indicated with the alternate long and short dash line and the force (detent force) of the soft magnetic member 01 applied to the rotor when the blade is activated in the clockwise direction from M1 and the force (detent force) of the soft magnetic member 02 applied to the rotor when the blade is activated on the contrary in the counterclockwise direction from N1 were set to be in an equal relationship.

On the contrary, in the present embodiment, the distance between M2 and 01 and the distance between N2 and 02 differ as indicated with the solid line, the former is set to be a great distance and the latter to be a short distance, and is differentiated in the drawing by 5 degrees in turning angle. Consequently, it is set for the force (detent force) of the soft magnetic member 01 applied to the rotor to be less when the blade is activated in the clockwise direction from M2 and for the force (detent force) of the soft magnetic member 02 applied to the rotor to be more when the blade is activated on the contrary in the counterclockwise direction from N2.

Therefore, the blade members move at a high speed for a short time during the closing operation from the opened state and moves on the contrary at a low speed for a long time during the opening operation from the closed state. With regards to the operation of the blades, design so as to obtain the optimal amount of displacement based on the relationship between the detent force at which the magnet rotor RO is attracted to the soft magnetic member NM and the repulsive force of the magnetic pole formed in the soft magnetic member NM. However, it must not exceed the neutral point NO of the magnet rotor RO.

The relationship between the amount of displacement and the operating speed of the blades in the device of this embodiment is shown in FIG. 12. A indicates the relationship to the time from the opened state to closing of the blades at displacement amount zero in a conventional device, B at displacement amount of 3 degrees, and C at displacement amount of 5 degrees. The charged voltage indicates the power supply voltage fed to the coil.

Figure 11:
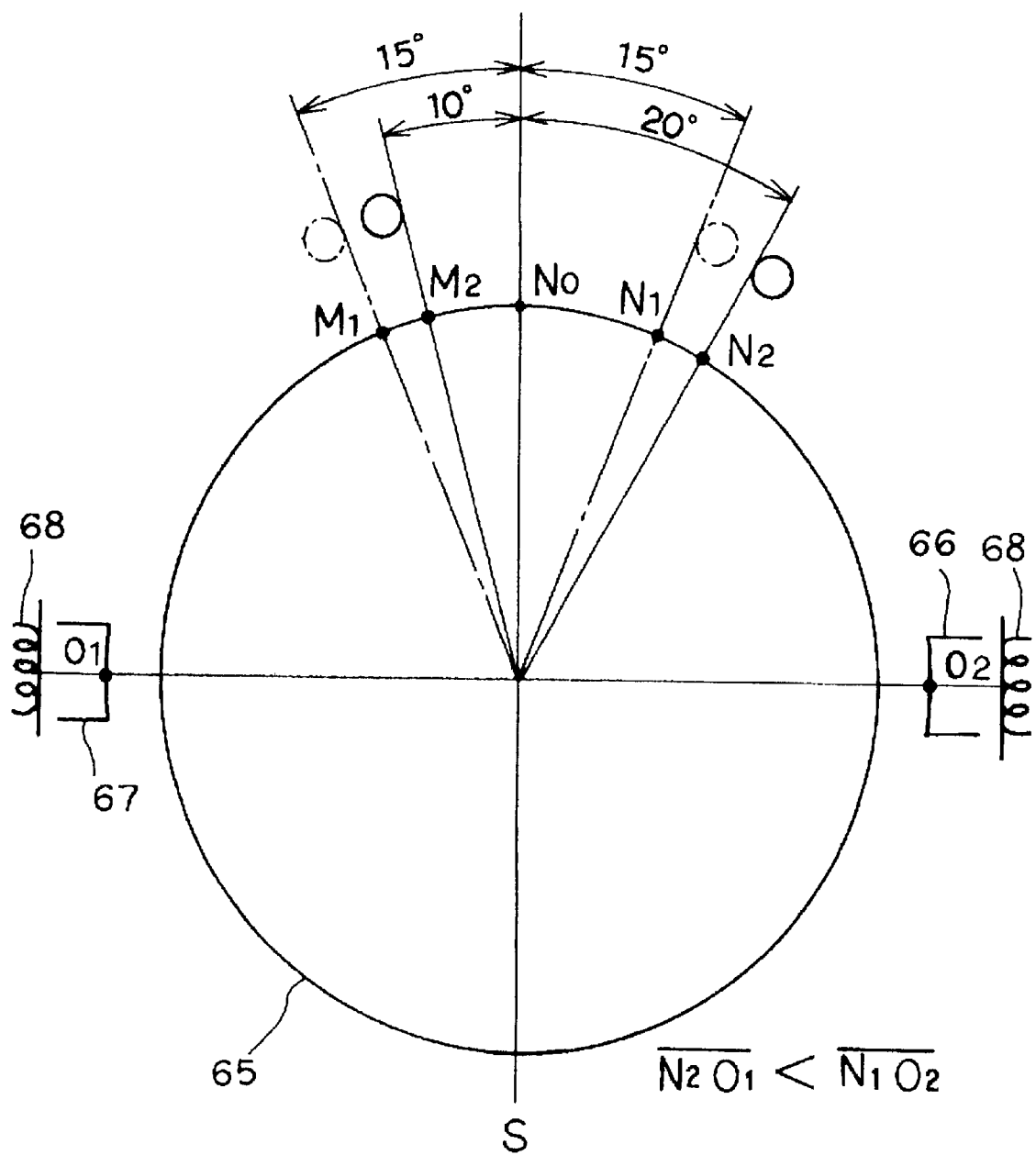
FIG. 11 shows an embodiment of the present invention and it is a view for describing the operating principle of a light quantity control unit.

In addition to differentiating the distance of the soft magnetic members and the magnetic poles of the magnet rotor between the open area and the closed area, the present embodiment can differentiate the starting torque by setting the relationship thereof into the state indicated with the alternate long and short dash line in FIG. 11 then changing the electric current or the voltage fed to the coil.

Figure 7:
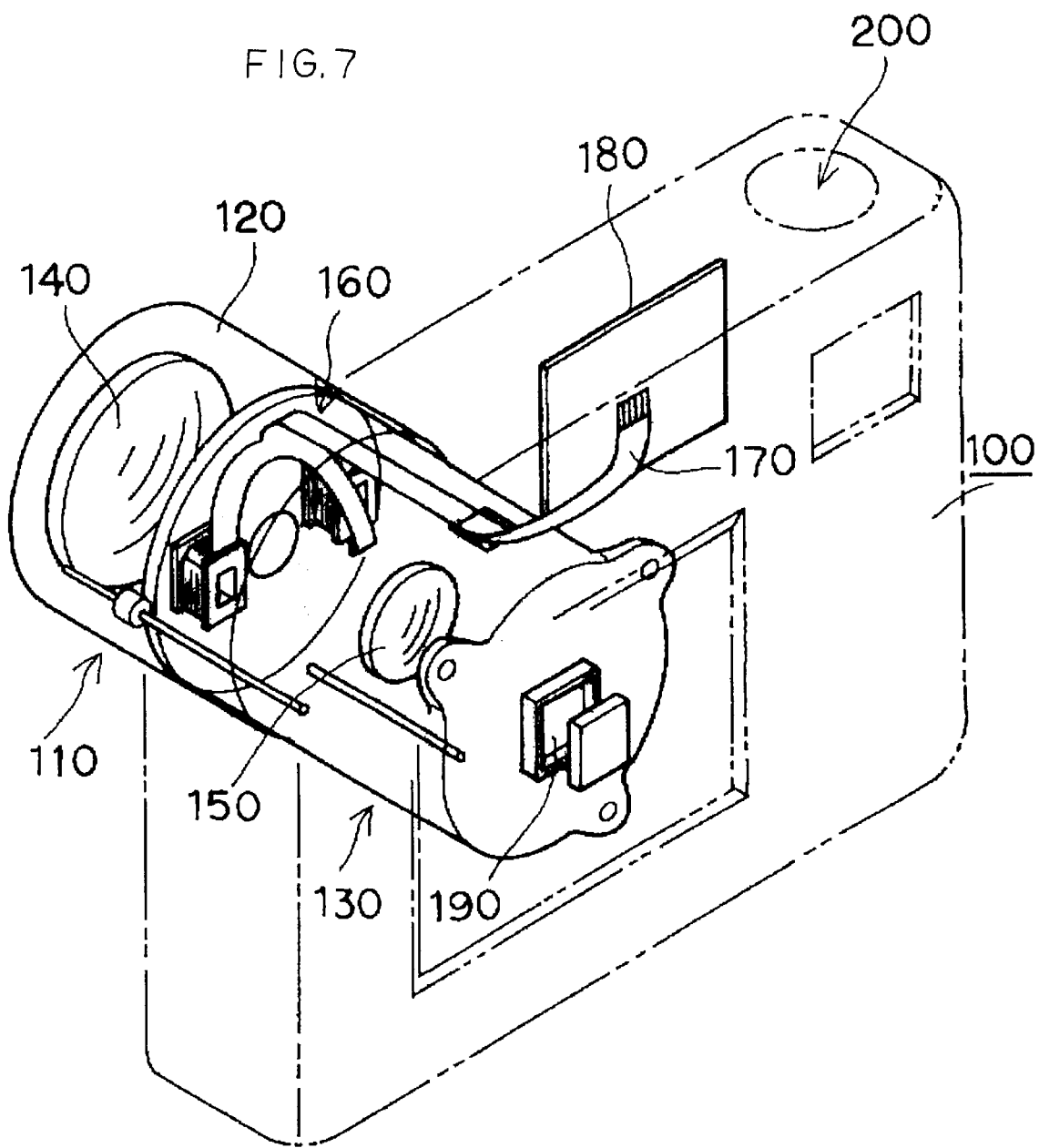
FIG. 7 shows an embodiment of the present invention and it is a perspective view showing a camera device integrated with a light quantity control unit.

Next, the light quantity control unit is incorporated into, for example, a camera device shown in FIG. 7.

The aforementioned light quantity control unit (160 in FIGS. 1 and 2) is incorporated between the front lens group 140 and the rear lens group 150 which are mounted in a plurality of lens configurations inside of the lens unit (lens-barrel) 110 provided to the camera body 100.

Then, a photoelectric conversion element 190 such as CCD, which converts light into electricity, is provided to the lens unit 110. Also, this photoelectric conversion element 190 is electrically connected to the control base plate 180 on the camera body 100 side and the timing for feeding power is controlled. A microcomputer for controlling the device is integrated to this control base plate 180 and photography is executed with the operation of a shutter button 200.

Figure 8:
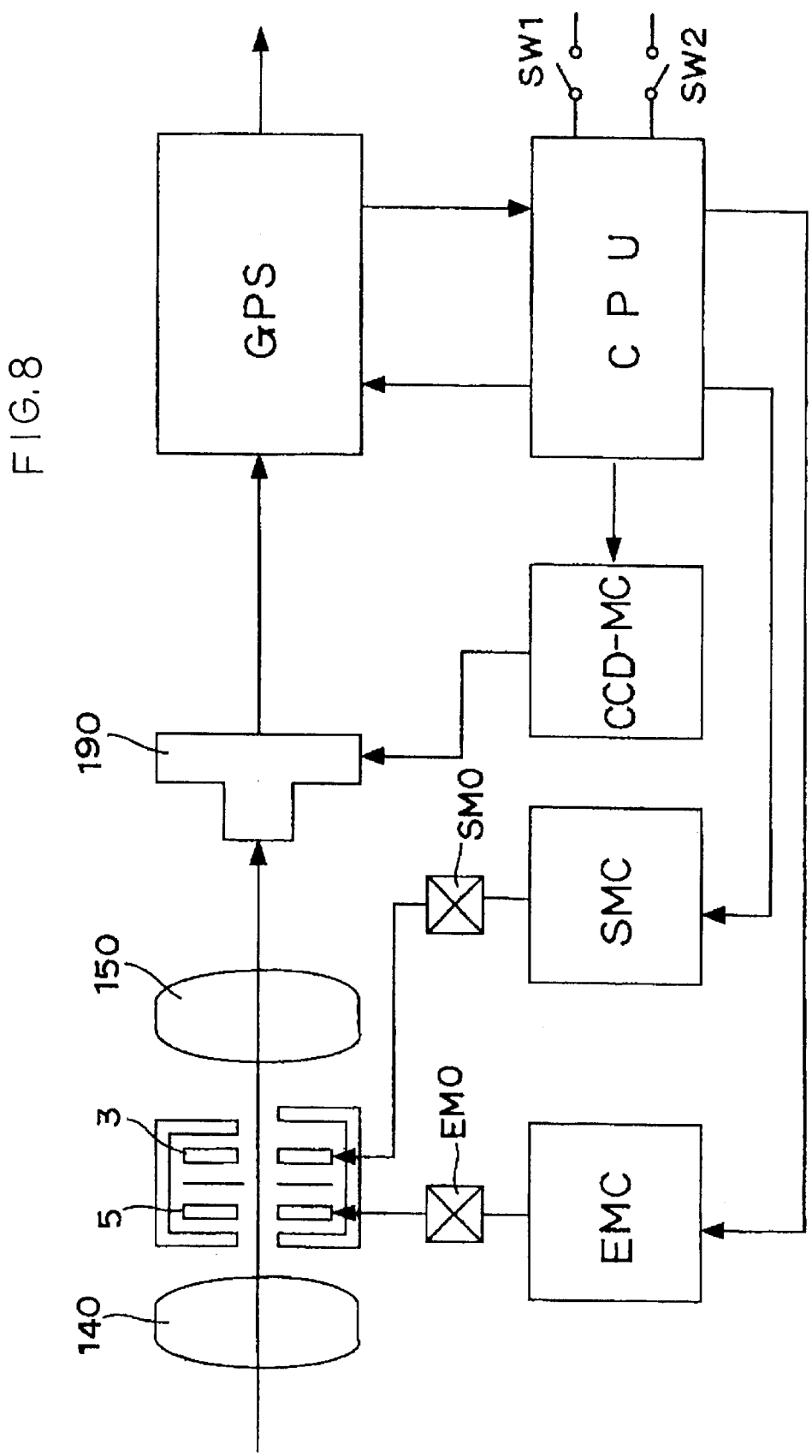
FIG. 8 shows an embodiment of the present invention and it is a schematic view showing the control circuit of a camera device integrated with a light quantity control unit.

The control circuit of this camera device will be described according to FIG. 8.

3 denotes a shutter blade and 5 denotes a diaphragm blade. EMO denotes an electromagnetic drive means for driving the diaphragm and SMO denotes an electromagnetic drive means for driving the shutter. Also, 140 denotes a front lens, 150 denotes a rear lens, 190 denotes a photoelectric conversion element, GPS denotes a picture signal processing circuit which executes a storing process, etc. of picture signals output from the photoelectric conversion element 190, SW1 denotes a release switch operated with a shutter button 200, SW2 denotes a main switch, and CPU denotes a microcomputer. Furthermore, SMC denotes a shutter driving circuit which feeds drive signals to the electromagnetic drive means SMO, EMC denotes a diaphragm driving circuit which feeds drive signals to the electromagnetic drive means EMO, and CCD-MC denotes an electronic shutter control circuit which controls the charge storage and charge discharge in the photoelectric conversion element 190.

Figure 9:
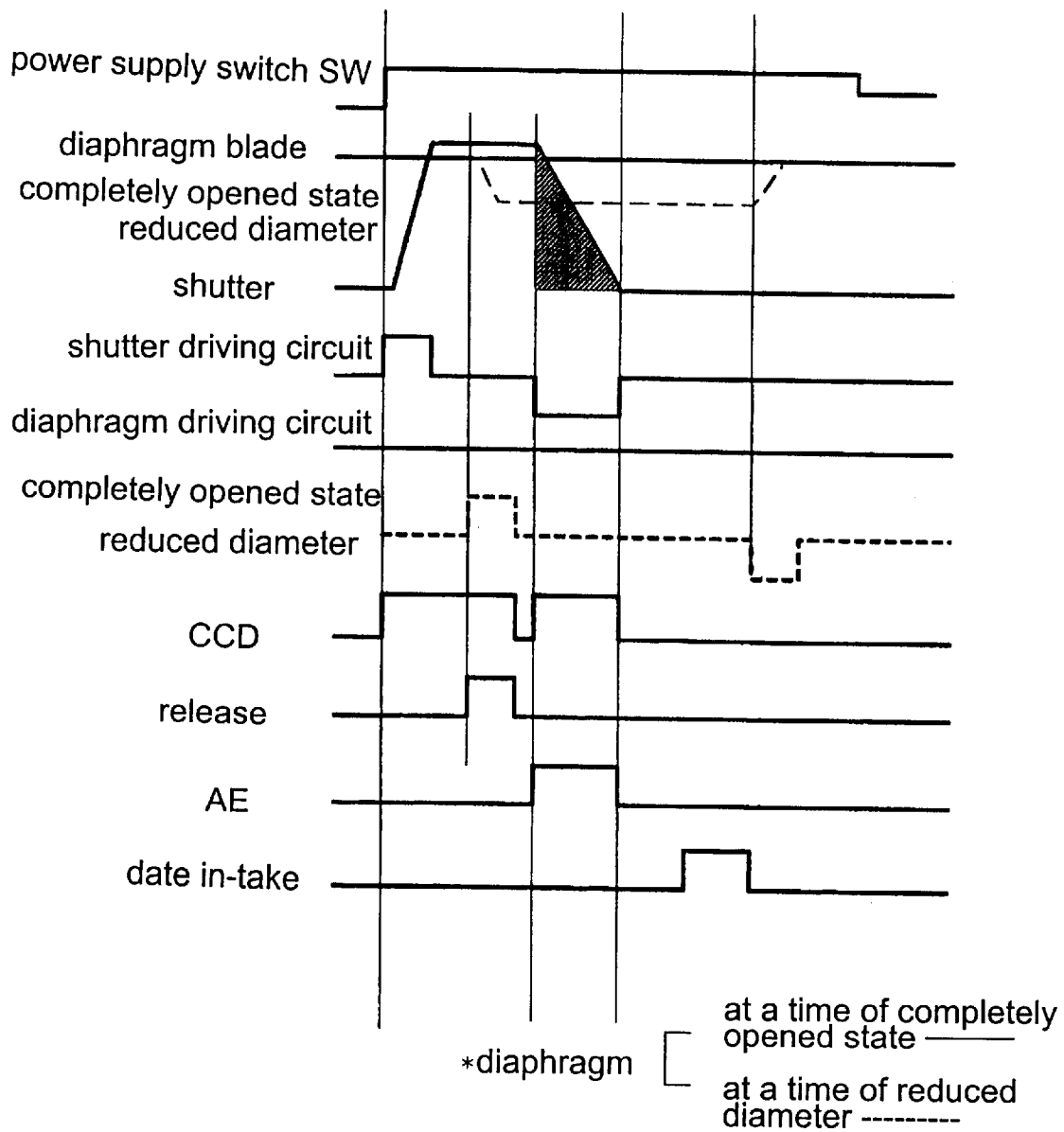
FIG. 9 shows an embodiment of the present invention and it is a timing chart for a camera device integrated with a light quantity control unit.

The operation of the device will be described according to FIG. 9.

In the non-operating state of the device, the shutter blades 3 are initially set in the opened state shown on the right side of FIG. 1 and the diaphragm blade 5 is in the completely opened state indicated with the solid line in FIG. 1.

When power is input to the camera main body in this state and set to the photographing state, light from the subject is received in the CCD and the aforementioned microcomputer sets the diaphragm value. The diaphragm values indicated in the drawing are in two stages and the microcomputer sets to either the completely opened state (the state indicated with the solid line in FIG. 1) at which the diaphragm blade does not regulate the aperture 8 and the closed state (the state indicated with the diagonal double dash line in FIG. 1) at which the aperture is reduced to a small diameter. Presently, if the shutter button 200 is operated and the microcomputer sets the aperture to a reduced diameter, the diaphragm driving circuit EMC functions to apply an electric current to the coil 68 of the drive unit 7. Then, the diaphragm blade 5 moves to the state indicated with the diagonal double dash line in FIG. 1 from the state indicated with the solid line in FIG. 1 and the aperture 8 takes on a state of reduced diameter. Then, even after the supply of power is cutoff, the blade 5 maintains a state of reduced diameter due to the magnet 65*a* of the magnet rotor 65 being attracted to the magnetic force inducing member 66*b*. Also, the aforementioned microcomputer computes the exposure time, resets the charge in the photoelectric conversion element 190 after the lapse of a prescribed delay time, and generates an instruction signal to close the shutter blades 3. Then, the light from the subject is stored as charge in the photoelectric conversion element 190, which was reset. The shutter driving circuit SMO then receives an indication signal to close the blades 3 and applies a predetermined current to the coil 68 of the drive unit 6. Then, the shutter blades 3 become closed as indicated on the left side of FIG. 1 from the opened state indicated on the right side of FIG. 1, storage of charge in the photoelectric conversion element 190 ends, and this charge is transmitted to an internal or an external memory from the picture signal processing circuit GPS with the receiving of a signal from the computer then stored as picture signals. Thereafter, by current being fed to the drive unit 7 of the diaphragm blade 5 based on the signal from the computer, this blade evacuates from the aperture 8. By the shutter blades 4 also being fed with current at the drive coil thereof, restoration is made to the opened state from the closed state. Then, it stands by for the next photographing operation.

Note that if the aforementioned microcomputer has set the diaphragm value to the completely opened state, a signal is not generated in the aforementioned diaphragm drive circuit EMC and current is not fed to the aforementioned drive unit 7. Therefore, the diaphragm blade 5 is in a state of having maintained the completely opened state.

The light quantity adjuster unit described above opens and closes the shutter blades 3 composed of two blades and the diaphragm blade 5 respectively with the drive unit 6 and the drive unit 7. The drive unit 6 and the drive unit 7 have the same configuration.

Figure 10:
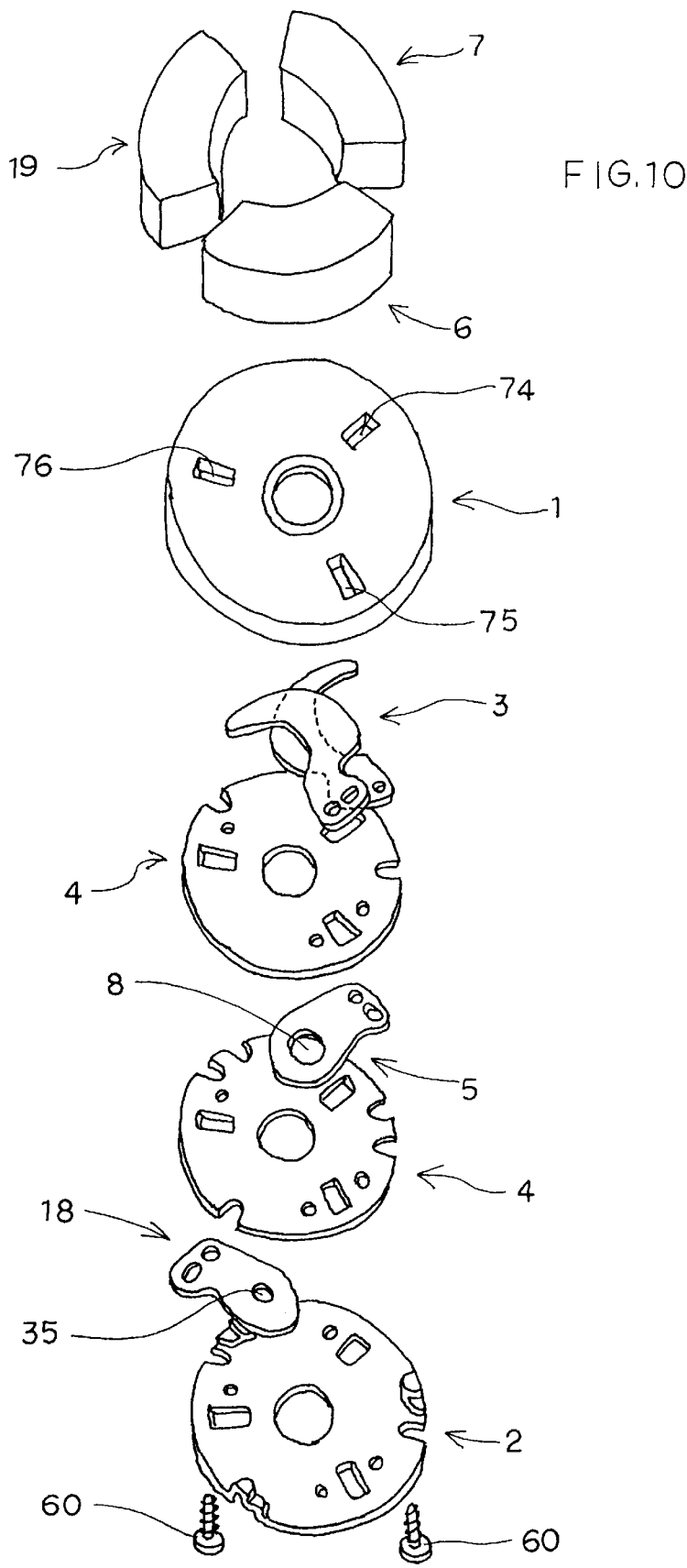
FIG. 10 shows another embodiment of the present invention and it is an exploded perspective view of a light quantity control unit.

As another embodiment, there is the embodiment shown in FIG. 10. A second diaphragm blade 18 having a smaller aperture 35 than the aperture 8 of the diaphragm blade 5 is added to the shutter blades 3 composed of two blades and the diaphragm blade 5. A drive unit 19 for opening and closing this diaphragm blade 18 is added by being arranged and fixed to the base plate 1 together with the drive unit 6 and the drive unit 7 for opening and closing the shutter blades 3 and the diaphragm blade 5. The drive unit 19 has the same configuration as drive units 6 and 7. Therefore, description for the internal configuration will b& omitted. Also, the shape of the drive units in the drawing is an approximate outer shape.

The drive unit 6, the drive unit 7, and the drive unit 19 are arranged on the base plate 1 without interfering with one another at the positions on the base plate 1 indicated with the alternate long and short dash line. The drive unit 6 opens and closes the shutter blades 3 with a transmission member, the drive unit 7 opens and closes the diaphragm blade 5 with a transmission member, and drive unit 19 opens and closes the second diaphragm blade 5 with a transmission member.

The aperture 35 provided to the second diaphragm blade is smaller than the aperture 8 provided to the diaphragm blade 5 so photography with a reduced diameter is possible when this second diaphragm blade has approached the aperture 35.

This invention is composed to have the aforementioned configuration and can provide a compact light quantity control unit of small major diameter, which takes up small space in the direction of the optical axis, at the periphery of the optical axis of the photographing lens part. In particular, there is a characteristic of being able to further miniaturize the device as a whole when integrating plurality of blades such as diaphragm blades, shutter blades, etc. and a plurality of drive units for driving these blades.

What is claimed is:

1. A light quantity control unit comprising:
   a base plate having an aperture forming an optical axis;
   a blade member disposed on the base plate to face the aperture for regulating a condition of the aperture;
   a coil formed into a cylindrical shape with two ends and arranged on said base plate parallel to the optical axis;
   a magnet rotor disposed near the coil parallel to the optical axis and polarized with two magnetic poles;
   a pair of magnetic force inducing members, each having a base end part disposed at each of the two ends of said coil, and a leading end part extending from the base end part perpendicular to the optical axis and having an equal thickness throughout an entire length thereof, said leading end parts surrounding said magnet rotor at a middle area thereof and providing two mutually opposed equal magnetic poles for rotating said magnet rotor; and
   regulating means formed at the base plate for regulating a rotation of said magnet rotor to swing at a predetermined angle between the two magnetic poles formed in the magnetic force inducing members.

2. The light quantity control unit according to claim 1, wherein said coil has a hollow portion; the base end parts of the magnetic force inducing members are disposed in the hollow portion; and each leading end part of the magnetic force inducing member has a bent portion at approximately a center part in a lengthwise direction thereof so that front areas of the leading end parts are located in substantially a plane perpendicular to the optical axis to surround said magnet rotor at the middle area thereof.

3. The light control quantity unit according to claim 1, wherein the regulating means is disposed in the base plate to regulate a movement of the blade member in an open area and a close area thereof such that an attraction force created between the magnet rotor and the magnetic force inducing members is differentiated between the open area and the close area.

4. The light quantity control unit according to claim 1, wherein the regulating means is disposed in the base plate to regulate a movement of the blade member in an open area and a closed area thereof such that a distance of the two magnetic poles in the magnet rotor and magnetic poles in the magnetic force inducing members is differentiated between an opened state and a closed state.

5. The light control quantity unit according to claim 1, wherein the blade member is shutter blades for blocking the aperture.

6. The light control unit according to claim 1, wherein the blade member is a diaphragm blade for regulating the size of the aperture.

7. The light quantity control unit according to claim 1, further comprising power supply means which selectively applies positive or negative current to the coil.

8. The light quantity control unit according to claim 1, further comprising a holding member mounted to the base plate with a space provided in-between so that the coil and the magnetic rotor are held between the base plate and the holding member parallel to the optical axis, the base ends of the magnetic force inducing members are engaged with the two ends of this coil extending along the optical axis.

9. The light quantity control unit according to claim 8, wherein a space between the base plate and the holding member along the optical axis is different at the coil and the magnet rotor.

10. The light quantity control unit according to claim 9, wherein the space between the base plate and the holding member at the magnet rotor is smaller than that at the coil.

11. The light quantity control unit according to claim 2, wherein said front area of said leading end part has an arc-shape projecting portion projecting inwardly from the front area to be located close to the magnet rotor, said front areas partly surrounding the magnet rotor to provide equal magnetic force to the magnet rotor.

12. A light quantity control unit comprising:
    a base plate having an aperture forming an optical axis,
    a first blade member disposed above the base plate for blocking the aperture,
    a second blade member disposed above the base plate for regulating a size of the aperture in the base plate,
    first drive means connected to the first blade member for opening and closing the first blade member, and
    second drive means connected to the second blade member for opening and closing the second blade member,
    wherein each of said first and second drive means comprises:
        a coil formed into a cylindrical shape with two ends and arranged on the base plate to orient along the optical axis,
        a magnet rotor disposed near the coil parallel to the optical axis and polarized with two magnetic poles,
        a pair of magnetic force inducing members, each having a base end part disposed at each of the two ends of the coil, and a leading end part extending from the base end part perpendicular to the optical axis and having an equal thickness throughout an entire length thereof, said leading end parts surrounding the magnet rotor at a middle area thereof and providing mutually opposed equal magnetic poles for rotating the magnet rotor,
        a regulating member formed at the base plate for regulating a rotation of said magnet rotor so as to swing at a predetermined angle between the two magnetic poles formed in said magnetic force inducing members, and
        a transmission member situated between the magnet rotor and each of the first and second blade members for transmitting a rotation of the magnet rotor to each of the first and second blade members.

13. The light quantity control unit according to claim 12, wherein the first and second drive means are respectively arranged at a periphery of the aperture in the base plate.

14. The light quantity control unit according to claim 12, further comprising power supply means which selectively impresses positive or negative current to the coil.

15. The light quantity control unit according to claim 12, further comprising a third blade member for regulating the size of the aperture, and third drive means for opening and closing the third blade member, said third driving means being formed as in the first and second drive means.

16. The light quantity control unit according to claim 15, wherein the first, second, and third drive means are respectively arranged at a periphery of the aperture in the base plate.

17. The light quantity control unit according to claim 15, further comprising power supply means which selectively impresses positive or negative current to the coil.

18. The light quantity control unit according to claim 12, wherein said leading ends provide equal magnetic poles to the magnet rotor.

19. A camera device comprising:
    a base plate having an aperture forming an optical axis;
    a blade member disposed on the base plate to face the aperture for opening and closing the aperture;
    a coil formed into a cylindrical shape with two ends and arranged on said base plate parallel to the optical axis;
    a magnet rotor disposed near the coil parallel to the optical axis and polarized with two magnetic poles;
    transmission means situated between the magnet rotor and the blade member for transmitting a movement of the magnet rotor to the blade member;
    a pair of magnetic force inducing members, each having a base end part disposed at each of the two ends of said coils, and a leading end part extending from the base end part perpendicular to the optical axis and having an equal thickness throughout an entire length thereof, said leading end parts surrounding said magnet rotor at a middle area thereof and providing two mutually opposed equal magnetic poles for rotating said magnet rotor;
    regulating means formed at the base plate for regulating a rotation of said magnet rotor so as to swing at a predetermined angle between the two magnetic poles formed in the magnetic force inducing members;
    release means for determining a timing for a photography; and
    a control circuit electrically connected to the releasing means and the coil, said control circuit generating a signal for closing the blade member after a predetermined time from an operation of this release means.

20. The camera according to claim 19, wherein said leading ends provide equal magnetic poles to the magnet rotor.

* * * * *